Figure 1:
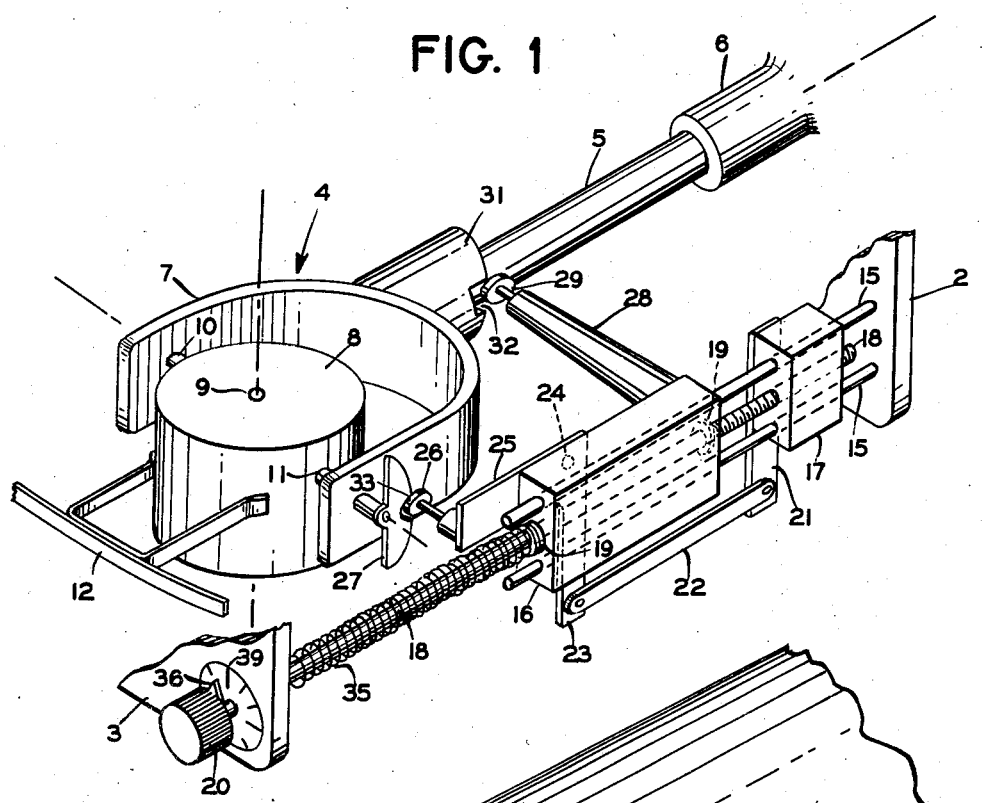

Aug. 12, 1958  P. E. SEIFRIED  2,846,886
VERTICAL GYRO COMBINED CAGING AND ERECTING MECHANISM
Filed April 25, 1956

INVENTOR.
PAUL SEIFRIED
BY *Herbert L. Davis*

ATTORNEY 2,846,886

VERTICAL GYRO COMBINED CAGING AND ERECTING MECHANISM

Paul E. Seifried, New City, N. Y., assignor to Bendix Aviation Corporation, Teterboro, N. J., a corporation of Delaware Application April 25, 1956, Serial No. 580,646

14 Claims. (Cl. 74—5.1)

This invention relates to gyroscopic instruments, particularly to those of the gyro vertical, or attitude indicating types, such as the artificial horizon instrument used in aircraft to indicate pitch attitudes. More particularly, the invention is concerned with mechanism for quickly restoring, when required, the gyro in such instruments to vertical position and to improvements in a gyro caging mechanism such as disclosed and claimed in U. S. Patent No. 2,716,344, granted August 30, 1955, to the inventor of the present invention and assigned to the same assignee, Bendix Aviation Corporation.

The invention finds particular use in aircraft of the type having a nose-up ground position, such as the non-tricycle landing gear type of aircraft. In craft of this design, conventional caging or quick gyro erecting devices serve to bring the gyro to a position perpendicular to the pitched position of the craft. This, however, would not represent the true vertical position of the gyro, that is to be desired in such operations.

The general object of this invention is, therefore, to provide a mechanism for quickly restoring a gyro to vertical in aircraft of the type having a nose-up ground position.

A feature of the invention is sliding mechanism, operable by a pull shaft, which mechanism, when slid in a particular direction, is cooperable with cam elements associated with the pitch and roll axis of the gyro to level and centralize, or cage the gyro mechanism.

A further feature of the invention is certain other mechanism associated with the sliding mechanism and with the cams whereby the gyro, after being centralized when the aircraft is in a pitch position, may be adjusted to its true vertical position.

A more specific object of the invention is to provide mechanism in an aircraft in order to cage and quickly restore an attitude indicating gyro to vertical position while the craft is in a pitch position.

A still further object of the invention is to provide mechanism for caging and vertically erecting a gyro regardless of the pitch position of the craft.

Another object of the invention is to provide improved and novel caging mechanism for attitude indicating gyros.

The invention further lies in the particular structure and design of the component parts thereof, as well as in their general arrangement and cooperative association with one another to effect the results intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

Figure 2:
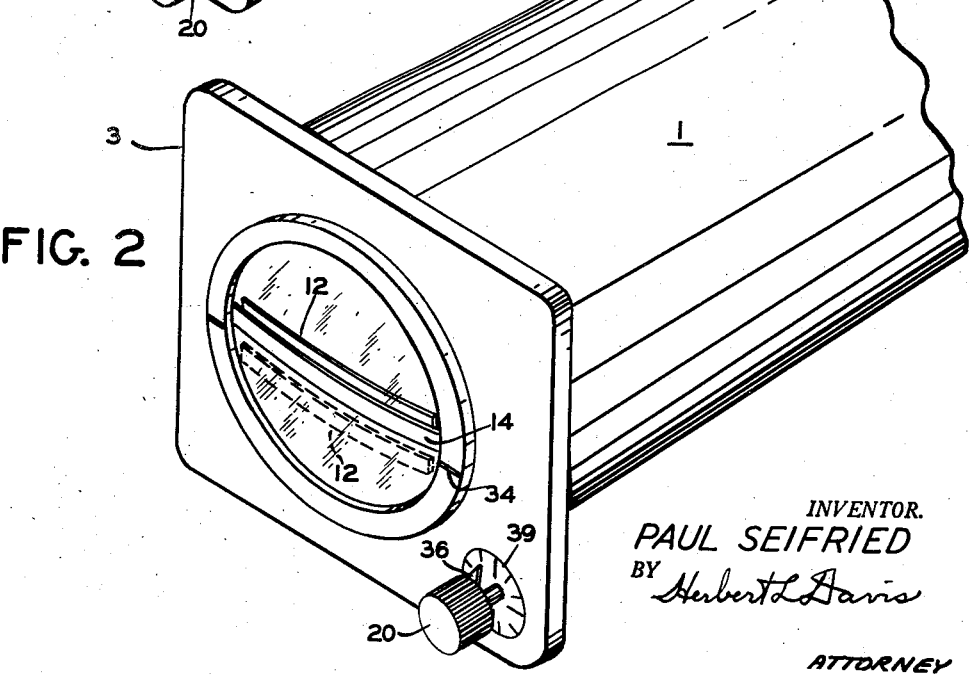

In the drawings:

Fig. 1 is a perspective showing of a gyroscopic instrument embodying the invention, certain well known parts being shown in schematic, and the supporting container being cut away; and Fig. 2 is a view of the front of the instrument.

For purposes of description, the invention is shown as embodied in an artificial horizon type indication instrument having a container 1, closed over at its rear by a wall 2 and at its front by a bezel assembly 3. Housed in the container is an outer gimbal member 4 rotatable on a roll or longitudinal axis provided by an elongated shaft 5 supported in a bearing member 6. Integral with the forward end of the shaft is a yoke or U portion, between the arms 7 of which is supported an inner gimbal or casing 8, schematically shown, in which is carried a gyro having a vertical spin axis 9. The horizontal axis of the gyro casing, as indicated by the trunnions 10, 11 thereof pivoted in gimbal arms 7, is perpendicular to the longitudinal axis of the outer gimbal. The instrument is normally housed in the panel, not shown, of an aircraft so that the longitudinal axis of the outer gimbal is parallel with that of the craft, and so that the bezel or window end of the instrument faces the pilot. Indications of pitching of the aircraft are provided by horizon simulating means, such as the horizon bar 12 that is mounted to the gyro casing for up and down movement relative to an attitude bar 14 fixed across the center of the bezel frame.

It is customary, when aircraft is on the ground preparatory to flight, to cage or orient the gyro. When the longitudinal or major axis of the gyro is brought into perpendicular relation to the minor or horizontal axis and the spin axis is brought into normal position relative to the major and minor axes, the gyro is said to be caged or centralized. The gyro is customarily positioned in an aircraft in such manner that the longitudinal axis is parallel to that of the craft. In this arrangement, when the craft is in a horizontal level position, caging of the gyro will quickly bring the gyro to its vertical position. In non-tricycle landing gear aircraft, where the plane has a normal nose-up or pitch ground position, caging the gyro will not of itself erect the spin axis of the gyro to vertical position. In such cases it is either necessary to level the craft or to provide supplemental means to adjust the gyro spin axis to its vertical position.

The present invention combines means for caging with further means for quickly adjusting the gyro to its true vertical position, in cases where the aircraft is in a pitch position, as in the case of grounded non-tricycle landing gear aircraft.

The mechanism to this end includes a pair of tracks 15 in parallel relation to the longitudinal axis of the gyro and fixed at their rear ends in the container wall 2. Slidably mounted on the tracks is a pair of blocks 16, 17 disposed in spaced relation, one rearwardly of the other.

An elongated rod 18, disposed intermediately of and parallel to the tracks, passes freely through block 16, and is threaded through block 17. A pair of collars 19 fixed on the rod and bearing lightly against opposite end faces of block 16 retain a fixed position of the latter on the rod, and yet, do not interfere with free turning of the rod in this block. The forward end of the rod projects freely through a hole in the bezel frame and carries a knob 20 thereon, so that the rod may be manually pulled in an outward direction or may be rotated.

Depending from the inner face of block 17 is a fixed arm 21, the lower end of which connects by a link 22 with a depending arm 23 of a right angular bellcrank lever. The latter pivots at its vertex 24 to the inner face of block 16 near the forward end of the latter. The other arm 25 of the bellcrank extends normally in parallel relation to rod 18 and carries a roller 26 on a pin projecting from its inner face. The roller is designed to engage with a heart shaped cam 27 fixed on an end of trunnion 11 that projects externally of an arm of the outer gimbal. Projecting laterally from the inner face of block 16 near the rear thereof is an elongated arm 28 which carries on its end a roller 29 designed to engage with a collar cam 31 formed on the roll axis shaft of the outer gimbal. The end wall of cam 31 forms an annular cam surface which decreases axially to a notch 32.

In the operation of the device, let it be assumed that the non-tricycle craft in which the gyro is embodied is on the ground in its normal nose-up or pitch position, and that the gyro is at rest with its spin axis off the vertical. In order to cage and centralize the gyro, and align the axes of the gyro relative to the respective axes of the aircraft, rod 18 is manually pulled by its knob progressively outward. This action draws both blocks 16 and 17 as a unit along the tracks and brings the roller elements 26, 29 into engagement with the cam surfaces respectively of cams 27 and 31, whereupon the associated gyro casing 8 and outer gimbal 4 are progressively rotated. They are finally brought into perpendicular relation to one another and into alignment with the corresponding axes of the aircraft as roller 26 enters the concaved well 33 of cam 27, and as roller 29 enters the locking recess 32 of cam 31. Engagement of the rollers in their respective recesses locks the centralized position of the gyro as long as the knob is held in its drawn position. This caging action also causes the horizon bar 12 to travel upwards relative to the attitude bar 14 until they are in alignment, indicating alignment of the pitch and roll axes of the gyro with the corresponding axes of the aircraft. Because of the normal ground pitch position of the aircraft on its non-tricycle landing gear, the spin axis of the caged gyro will be in a position normal to the other two axes, but will not be in a true vertical position as desired.

To effect the vertical position of the gyro, rod 18 is rotated by manually turning the knob. Here, this will be in a clockwise direction, whereupon block 17 threaded onto the rod 18 will travel forwardly causing link 22 to pivot the bellcrank lever. Block 16 does not move when rod 18 is turned. Action of the bellcrank lever causes roller 26 to ride out of the cam well and over the upper part of the cam surface to effect a forward pitch of the gyro casing. As the latter progressively pitches, the horizon bar 12 moves downward relative to the attitude bar 14. Rotation of the rod 18 is discontinued as the horizon bar aligns with the bezel markings 34, indicating the normal pitch position of the craft upon the ground as well as the vertical position of the gyro. During this adjustment of the gyro casing, any torque transmitted to the outer gimbal is prevented from rotating the same, due to the locked position of roller 29 in the notch of the collar cam.

The knob is manually held in its drawn position for a few seconds after caging, until the gyro motor reaches its operating speed, whereupon it is released and restored by a spring 35. Rod 18 is then rotated back to its normal position as will be indicated when the pointer 36 on knob 20 is brought into alignment with the normal position mark 39.

It can also be seen, that after the block members 16 and 17 are restored to normal position, caging of the gyro so as to centralize and quickly erect the gyro to vertical position and lock the same can be effected, if desired while the aircraft is in horizontal level flight, by simply drawing the rod 18 in an outward direction.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the form shown and described, but also in all such forms and modifications as may reasonably be construed to be within the spirit of the invention and the scope of the appended claims.

What is claimed is:

1. In a vertically seeking gyro including a first gimbal having a longitudinal axis, a second gimbal bearing the gyro and having a horizontal axis perpendicular to the said longitudinal axis defined by trunnions pivoted in arms of the first gimbal, means for leveling the gimbals to bring their respective longitudinal and horizontal axes in mutual perpendicular relation to each other, means for simultaneously locking the gimbals in this leveled position, and said last mentioned means including means for releasing only the second gimbal from said locked position and adjusting it angularly about its horizontal axis to a desired position.

2. In a vertically seeking gyro having three degrees of freedom represented by a spin axis normal to mutually perpendicular horizontal and longitudinal axes, the combination of means for caging the gyro about its respective axes and locking it in its caged position, and said last mentioned means including means operative to release the gyro from its locked position relative to its horizontal axis and further operative to adjust the gyro on said horizontal axis angularly from its normal position to a desired position.

3. In a gyroscopic instrument including a bearing support; a first gimbal member mounted therein to rotate about a longitudinal axis; a second gimbal member mounted in the first gimbal to rotate about a horizontal axis mutually perpendicular with the longitudinal axis; a gyro mounted in the second gimbal with its spin axis normal to the horizontal and perpendicular axes; a collar cam fixed to the first gimbal on its turning axis and including a locking recess; a locking roller member slidable into camming engagement with the collar cam to orient the same and, as a consequence, to orient the first gimbal to a reference position in said bearing support, and to engage the locking recess when in oriented position; a heart-shaped cam fixed to the second gimbal on its turning axis to rotate in a plane at right angles to the latter axis and including a concaved well in its periphery; a second locking roller member slidable into camming engagement with the heart-shaped cam to orient the same and the second gimbal relative to a reference position in the first gimbal and to engage in the well when in oriented position; means for sliding both rollers simultaneously into engagement with their respective cams; and said last mentioned means including means for subsequently simultaneously holding the first roller engaged in the collar cam recess and moving the second roller out of the well of the heart-shaped cam and back into camming engagement with the latter to rotate the same and to angularly turn the second gimbal on its turning axis to a desired position.

4. In a gyroscope, including a rotor having a normally vertical spin axis, a casing supporting the rotor, a gimbal supporting the casing for oscillation about a horizontal axis perpendicular to the spin axis, and a housing supporting the gimbal for oscillation about a second horizontal axis mutually perpendicular to the first two axes: first camming means for camming the gimbal about its axis to a reference position in the housing, second camming means for camming the casing about its axis to a position wherein the spin axis of the gyro is mutually perpendicular to the said horizontal axes, means for actuating both camming means simultaneously, means effective in the camming operation to lock the cammed positions of the casing and gimbal, and said actuating means including means for subsequently releasing only the casing from its locked position and further camming the same to a desired position about its horizontal axis.

5. In combination with a vertically seeking gyro including a casing for the gyro, a gimbal in which the casing is pivoted by trunnions on a horizontal axis, the gimbal having a shaft rotatably supported in a bearing and defining a horizontal axis of rotation at right angles to that of the casing: an annular gimbal orienting cam unitary with the gimbal and having a locking recess therein; a cardioid casing orienting cam fixed to the end of one of the casing trunnions at right angles thereto, and having a locking valley therein; a pair of tracks in parallel relation to the gimbal shaft; a pair of blocks, one spaced to the rear of the other on the tracks and slidable thereon; a roller carried at the end of an arm projecting laterally from the forwardly positioned block, engageable with the annular cam to orient the gimbal relative to its bearing support and being receivable in the locking recess at the time of orientation; a fixed arm depending from the rear block; a bellcrank pivoted on the forward block; a link connecting the fixed arm to an arm of the bellcrank; a roller carried on a second arm of the bellcrank engageable with the cardioid cam to orient the casing relative to the gimbal and being receivable in the locking valley at the time of orientation; means for sliding both blocks as a unit to effect engagement of both rollers with their respective cams to effect orientation of the respective gimbal and casing and consequent locking of the same in oriented position; and said last mentioned means including means to effect subsequent sliding movement of only the rear block to effect consequent pivoting of the bellcrank and riding of the related roller out of the valley and over the cardioid cam to cause angular movement of the casing on its horizontal axis from its oriented position.

6. The structure according to claim 5, wherein the means to effect subsequent sliding movement of only the rear block is manually controlled.

7. The structure according to claim 5, wherein the means to effect subsequent sliding movement of only the rear block comprises, a slide rod disposed parallel to the tracks and passing freely through the forward positioned block and threaded in its rear portion through the rear block.

8. The structure according to claim 5, wherein the means for sliding both blocks as a unit comprises a slide rod disposed parallel to the tracks, threadedly engaged in its rear portion in the rear block and having means retaining the forward block in a fixed position on the rod.

9. The structure according to claim 5, wherein the means for sliding both blocks as a unit and the means to effect subsequent sliding of only the rear block comprise: an elongated pull rod disposed parallel to the tracks, threadedly engaged in its rear portion through the rear block, and having means retaining the forward block in a fixed position on the rod and allowing angular movement of the slide rod in the forward block, whereby upon linear sliding movement of the rod, both blocks are caused to move as a unit, and upon angular movement of the rod, only the rear block is caused to move along the threaded portion of the rod.

10. In a vertical gyro instrument of the character described including a first and a second member mounted for rotatable movement: camming means individual to each member for effecting rotation thereof to a reference position relative to the other member; and control means operable linearly to simultaneously actuate the camming means of both members, and operable angularly to actuate the camming means of only a predetermined one of the members.

11. In combination: a rotatable gyro gimbal member; camming means for rotating the member, including an integral cam carried by the member and a roller engageable against the cam for rotating the member; a pair of tracks; a slide block carrying the roller and slidable on the tracks for bringing the roller into camming engagement with the cam; a pull rod passing freely through the slide block for free angular movement therein; means disposed on the rod to either side of the block to enable linear movement of the block with the pull rod; a second gyro gimbal member rotatable on an axis transversely to that of the first gimbal member and carrying an integral cam; a second roller engageable against the latter cam for rotating the same and the second gimbal member; a two armed bellcrank pivoted to the block and carrying the second roller on one arm thereof; a second block to the rear of the first and also slidable on the tracks; a link connecting the other arm of the bellcrank to an ear of the second block and spacing the latter block rearwardly from the first; and a threaded portion at the end of the pull rod threadedly engaged through the second block; the pull rod being linearly actuable to effect a linear movement of both blocks on the tracks and consequent engagement of both rollers with the cam members, and the pull rod being actuable angularly to effect threaded movement of only the second block to effect camming engagement of the second roller with its related cam.

12. In combination: a pair of tracks, a first block slidable on the tracks, camming means mounted to the block for effecting, when moved, camming action against a first operative device, a two-armed bellcrank pivoted to the block, other camming means mounted to one arm of the bellcrank effecting when moved camming action against a second operative device associated with the first operative device, a second block rearwardly of the first and also slidable on the tracks, an ear carried by the second block, a link connecting the other arm of the bellcrank to the ear of the second block, and means common to both blocks for selectively moving both blocks simultaneously along the tracks for carrying both camming means to effect camming action against their respective first and second related devices, or for moving only the second block along the tracks to move through the bellcrank the other camming means to effect camming action against its second operative device associated with the first operative device.

13. Device actuating mechanism comprising a pair of tracks, a first block slidable along the tracks, a device actuating member carried by the first block, a pull rod disposed parallel to the tracks and passing freely through the block for free angular movement therein, means carried on the rod to either side of the block to enable linear movement of the block with the rod, a right angular bellcrank member, a second device actuating member mounted to one arm of the bellcrank, a second block rearwardly of the first also slidable along the tracks, an ear carried by the second block, a link connecting the other arm of the bellcrank to the ear of the second block and spacing the latter from the first block, and the second block being threaded upon a rear portion of the pullrod.

14. In the mechanism as in claim 13 wherein spring means is provided for restoring the pullrod in a direction opposed to the direction of pull.

References Cited in the file of this patent

UNITED STATES PATENTS 2,297,265    Manteuffel    Sept. 29, 1942